United States Patent
Fukuda et al.

(10) Patent No.: US 6,242,709 B1
(45) Date of Patent: Jun. 5, 2001

(54) METHOD FOR MANUFACTURING CONDUCTIVE WAFERS, METHOD FOR MANUFACTURING THIN-PLATE SINTERED COMPACTS, METHOD FOR MANUFACTURING CERAMIC SUBSTRATES FOR THIN-FILM MAGNETIC HEAD, AND METHOD FOR MACHINING CONDUCTIVE WAFERS

(75) Inventors: Makoto Fukuda; Masanori Chikuba, both of Osaka (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/229,678

(22) Filed: Jan. 13, 1999

(30) Foreign Application Priority Data

Jul. 29, 1998 (JP) .................................. 10-213646

(51) Int. Cl.⁷ .............................. B23H 1/00; B23H 7/02; B23H 9/02
(52) U.S. Cl. ..................................... 219/69.17; 219/69.12
(58) Field of Search ............................. 219/69.12, 69.11, 219/69.1, 68, 69.17; 501/87, 90

(56) References Cited

U.S. PATENT DOCUMENTS

| | | | |
|---|---|---|---|
| 4,525,179 | * | 6/1985 | Gigl ................................. 219/69.12 |
| 4,582,812 | | 4/1986 | Furukawa et al. . |
| 4,650,776 | * | 3/1987 | Cerceau et al. ................... 219/69.17 |
| 5,994,250 | * | 11/1999 | Suzuki et al. ........................... 501/87 |
| 6,001,756 | * | 12/1999 | Takahashi et al. . |
| 6,013,236 | * | 1/2000 | Takahashi et al. . |

FOREIGN PATENT DOCUMENTS

| | | | |
|---|---|---|---|
| 781619 | * | 12/1995 | (EP) . |
| 51-140470 | | 12/1976 | (JP) . |
| 59-42224 | | 3/1984 | (JP) . |
| 61-168422 | | 7/1986 | (JP) . |
| 61-288925 | | 12/1986 | (JP) . |
| 62-034727 | | 2/1987 | (JP) . |
| 6-155449 | | 6/1994 | (JP) . |
| 7-324980 | * | 12/1995 | (JP) . |
| 9-248719 | | 9/1997 | (JP) . |
| 10-119031 | | 5/1998 | (JP) . |

* cited by examiner

Primary Examiner—Geoffrey S. Evans
(74) Attorney, Agent, or Firm—Nixon Peabody LLP; Jeffrey L. Costellia'

(57) ABSTRACT

A method for manufacturing thin-plate sintered compacts according to the present invention includes the steps of: forming a conductive sintered compact to have such a thickness as to cause a warp to a negligible degree; and slicing the conductive sintered compact, thereby cutting and dividing the conductive sintered compact into at least two wafers.

12 Claims, 7 Drawing Sheets

METHOD FOR MANUFACTURING CONDUCTIVE WAFERS, METHOD FOR MANUFACTURING THIN-PLATE SINTERED COMPACTS, METHOD FOR MANUFACTURING CERAMIC SUBSTRATES FOR THIN-FILM MAGNETIC HEAD, AND METHOD FOR MACHINING CONDUCTIVE WAFERS

BACKGROUND OF THE INVENTION

The present invention relates to respective methods for manufacturing conductive wafers, thin-plate sintered compacts and ceramic substrates for a thin-film magnetic head and to a method for machining conductive wafers.

In recent years, a thin-film magnetic head has been used for various types of magnetic recording devices such as a hard disk drive (HDD) and a floppy disk drive (FDD) for a computer. As a thin-film magnetic head has been downsized, the thickness of a wafer, used as a substrate for such a head, has also been reduced. Since a substrate for a magnetic head is required to have high hardness and high abrasion resistance, $Al_2O_3$—Ti, SiC and $ZrO_2$ ceramics are currently used therefor. For example, an ALTIC wafer, widely used currently as a ceramic substrate for a magnetic head, is manufactured by sintering a powder green compact of raw materials such as alumina ($Al_2O_3$) and titanium carbide (TiC). An ALTIC wafer having a thickness of about 1.2 mm is practically used today as a substrate for a magnetic head. In order to realize magnetic recording with even higher density, however, the development of an even thinner and further planarized ceramic substrate is awaited.

A sintering process is indispensable for manufacturing a ceramic substrate. However, in accordance with currently available techniques, a sintered ceramic substrate is often deformed, e.g., warped, during the sintering process. One of the main reasons is the non-uniform temperature distribution of the sintered compact during the sintering process. It is now known that the thinner the thickness of a ceramic substrate to be formed is (e.g., if the thickness is equal to or smaller than 2 mm), the more warped the substrate is likely to get. Conventionally, such a "warp" has been eliminated by planarizing the surface of a substrate through polishing.

A sintered compact used as a substrate for a thin-film magnetic head has extremely high hardness (the Vickers hardness thereof is 2,000 or more). Accordingly, it takes a very long time to polish such a sintered compact. For example, sometimes it takes several tens of hours to reduce the thickness of a plate sintered compact from 2 mm to 1.2 mm by polishing it. On the other hand, the thinner a sintered compact is, the less rigid and the more warped the sintered compact gets. Thus, if an even thinner ceramic substrate is required in the near future, the conventional method for forming a ceramic substrate will take an enormous amount of time to perform various post-sintering processes like polishing. Accordingly, it is expected that the productivity will drastically decrease in such a case. In other words, this problem constitutes a great obstacle to further increasing the productivity of a thin-film magnetic head.

It is noted that the "warp" problem is not unique to a ceramic substrate for a thin-film magnetic head, but possibly happens during the formation of any thin-plate sintered compact in general. Therefore, the above-described problems (that is, polishing for eliminating such a warp takes a lot of time and increases the manufacturing cost) are generally true of any method for manufacturing a sintered compact involving a sintering process (e.g., a method for manufacturing a sintered magnet).

SUMMARY OF THE INVENTION

In view of these problems, the present invention was made to provide respective methods for manufacturing conductive wafers, thin-plate sintered compacts and ceramic substrates for a thin-film magnetic head, and a method for machining conductive wafers, with a long polishing time, conventionally required for eliminating a "warp", shortened by reducing the "warp" of a sintered compact.

A method for manufacturing thin-plate sintered compacts according to the present invention includes the steps of: forming a conductive sintered compact to have such a thickness as to cause a warp to a negligible degree; and slicing the conductive sintered compact, thereby cutting and dividing the conductive sintered compact into at least two wafers.

A method for manufacturing conductive wafers according to the present invention includes the steps of: forming a conductive sintered compact having two surfaces that are substantially parallel to each other; and slicing the conductive sintered compact along at least one plane substantially parallel to the two surfaces of the conductive sintered compact, thereby cutting and dividing the conductive sintered compact into at least two conductive wafers.

Another method for manufacturing thin-plate sintered compacts according to the present invention includes the steps of: forming a conductive sintered compact having a Vickers hardness of 2,000 or more by sintering raw material powder; and slicing the conductive sintered compact by wire electrical-discharge machining, thereby forming at least two thin-plate sintered compacts, each said thin-plate sintered compact having a thickness smaller than that of the conductive sintered compact.

Still another method for manufacturing thin-plate sintered compacts according to the present invention includes the steps of: forming a sintered compact having a Vickers hardness of 2,000 or more by sintering a raw material powder; and slicing the sintered compact, thereby forming at least two thin-plate sintered compacts, each said thin-plate sintered compact having a thickness smaller than that of the sintered compact.

A method for manufacturing ceramic substrates for a thin-film magnetic head according to the present invention includes the steps of: forming a conductive sintered compact having two surfaces that are substantially parallel to each other by sintering raw material powder and polishing a resulting sintered compact; and slicing the conductive sintered compact along at least one plane substantially parallel to the two surfaces of the conductive sintered compact, thereby cutting and dividing the conductive sintered compact into at least two ceramic substrates for a thin-film magnetic head.

A method for machining conductive wafers according to the present invention includes the steps of: setting a conductive sintered compact into an electrical-discharge wire cutting machine; and cutting and dividing the conductive sintered compact into a plurality of conductive wafers by slicing the conductive sintered compact with the application of a voltage between a wire of the electrical-discharge wire cutting machine and the conductive sintered compact while one of the wire and the conductive sintered compact is moved against the other. Each said conductive wafer has a crown of 50 μm or less and a thickness that is one half or less of the thickness of the conductive sintered compact.

DESCRIPTION OF THE PREFERRED EMBODIMENTS

If a sintered compact is formed by a conventional sintering process (e.g., hot pressing) to have a thickness of 2 mm or less, for example, the sintered compact is "warped" because of various factors. The present invention is characterized by forming a relatively thick sintered compact having such a thickness (e.g., more than 2 mm) as to cause a "warp" to a negligible degree and then slicing the sintered compact into at least two wafers.

Hereinafter, an embodiment of the present invention will be described with reference to the accompanying drawings.

First, a method for manufacturing ceramic substrates for a thin-film magnetic head according to the present invention will be described with reference to FIGS. 1 through 3D.

Figure 1:
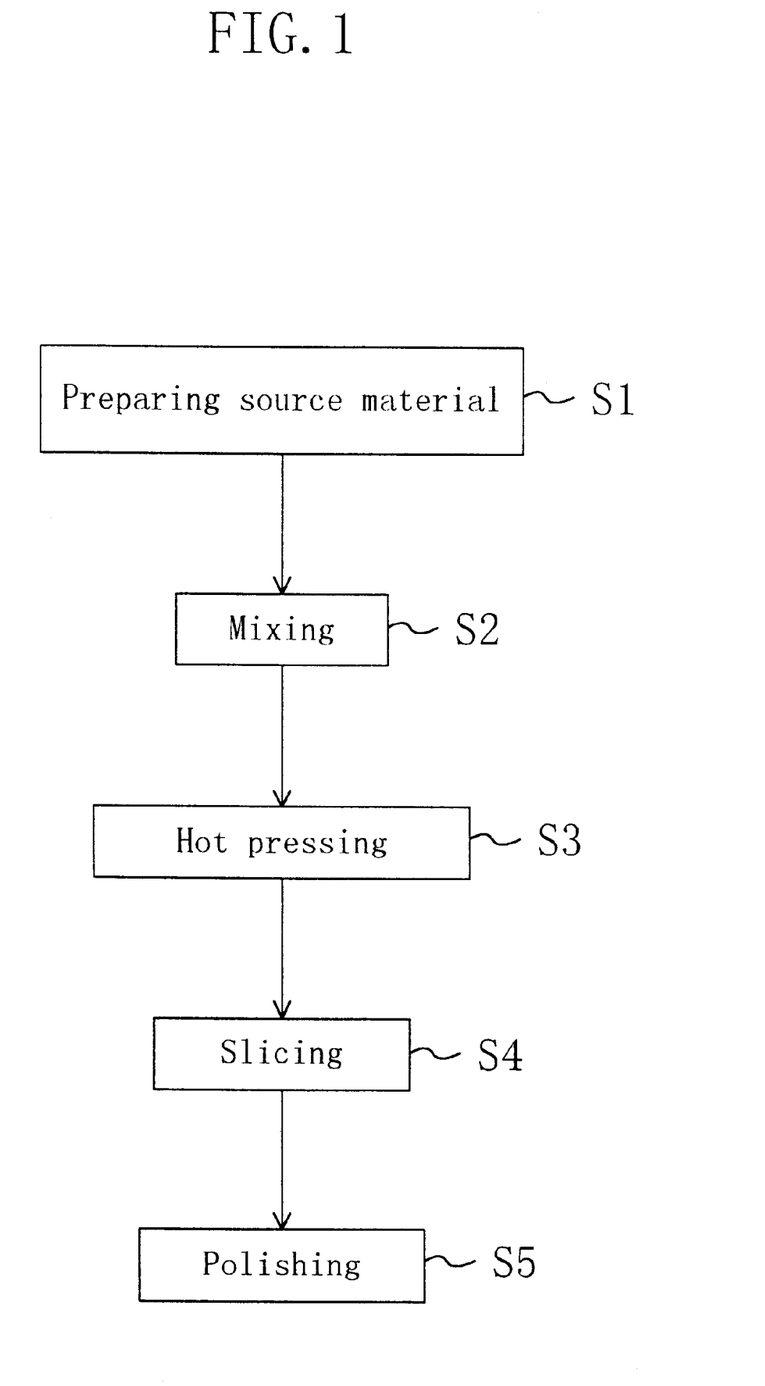
FIG. 1 is a flow chart illustrating main process steps for manufacturing ceramic substrates.

FIG. 1 is a flow chart illustrating main process steps for manufacturing ceramic substrates. In this embodiment, first, raw material powder of alumina, titanium carbide and the like is prepared in Step S1. Then, the power is mixed in Step S2, and sintered by hot pressing in Step S3 to form a rectangular conductive sintered compact having a thickness of about 4 mm, a length of about 100 mm and a width of about 100 mm. In this embodiment, alumina contained in the resulting sintered compact is about 70% by weight and titanium carbide contained in the sintered compact is about 30% by weight. The sintered compact may contain any other component such as MgO. The Vickers hardness of the resulting sintered compact is in the range from about 2,400 to about 2,500. In accordance with a conventional manufacturing method, polishing (e.g., mirror polishing) is subsequently performed for a long time to eliminate a "warp" from the sintered compact. In this embodiment, however, since the sintered compact has a relatively large thickness of about 4 mm, the sintered substrate has high rigidity and is hardly "warped". The process of forming a conductive sintered compact out of alumina and titanium carbide by sintering is described in detail in Japanese Publication for Opposition No. 61-50906, for example. This process itself is performed in a conventional manner.

The surfaces of the conductive sintered compact are preprocessed by polishing these surfaces for a short period of time, for example. Thereafter, a slicing process step S4 for cutting and dividing the sintered compact into two wafers is performed. In this embodiment, since the workpiece is made of a high-hardness ceramic having conductivity, wafer slicing is performed by electrical-discharge machining (EDM) technique. The two wafers, sliced off from a single sintered compact, each have a thickness of about 1.6 mm to about 1.8 mm, for example. Each of these wafers is subjected to a polishing process step S5 such as mirror polishing using diamond slurry (average grain diameter: about 1 $\mu$m), thereby ultimately forming a wafer having a thickness of about 1.2 mm (surface roughness Ra: 200 nm or less). In polishing a sintered compact having a thickness of 2 mm in a conventional manner to have the thickness reduced to 1.2 mm, the wafer should lose 0.8 mm by the polishing. By contrast, in this embodiment, the thickness of the wafer to be lost by polishing may be 0.7 mm or less.

Subsequently, the wafer obtained in this manner is subjected to an additional process step if necessary: marking by the use of a laser device; forming an insulating coating on the surface of the wafer by sputtering; or the like.

Figure 2:
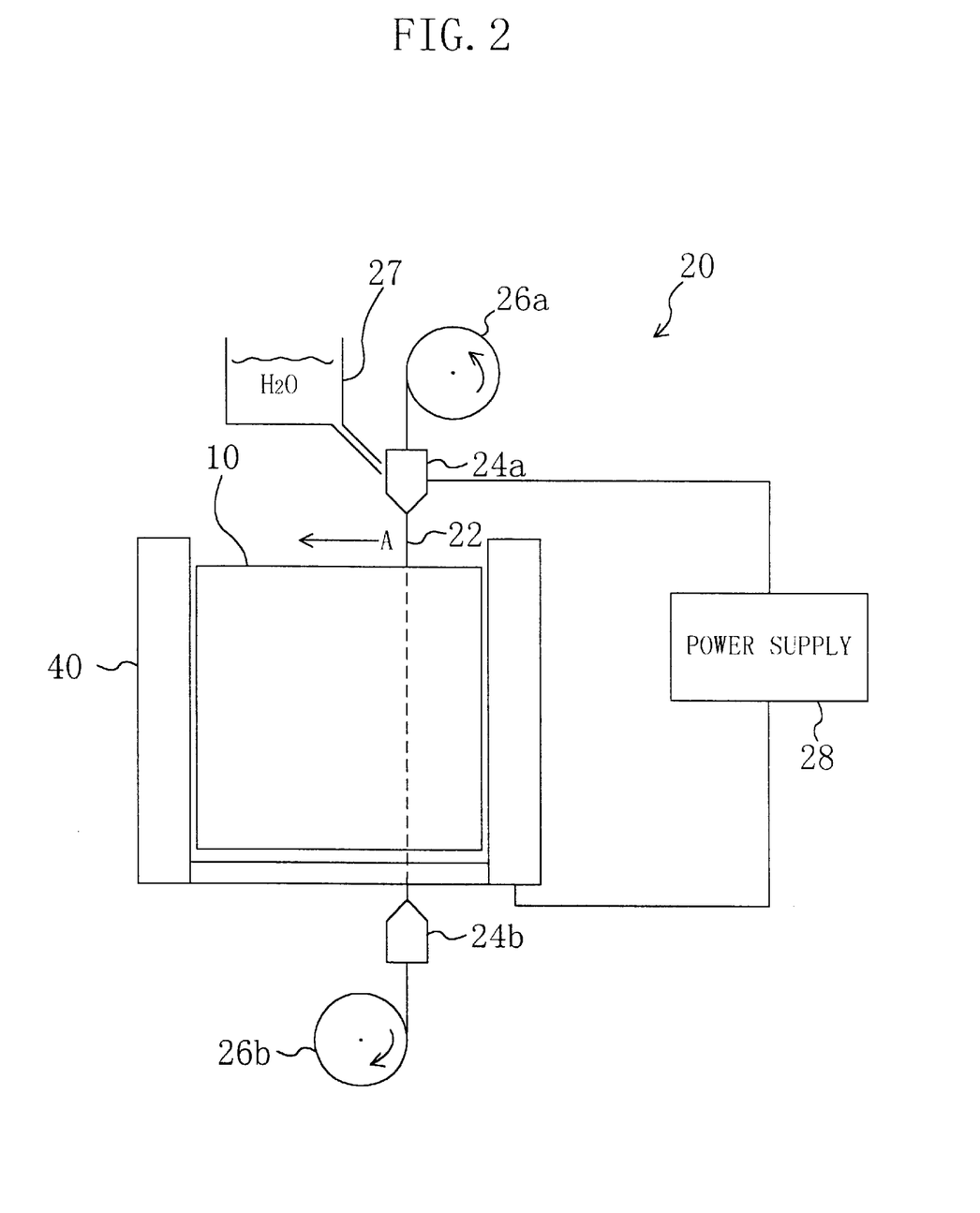
FIG. 2 is a schematic representation illustrating an arrangement for an electrical-discharge wire cutting machine preferably used for a slicing process step in one embodiment of the present invention.

FIG. 2 is a schematic representation illustrating an arrangement for an electrical-discharge wire cutting machine 20 preferably used for slicing in this embodiment. The machine shown in FIG. 2 is constructed such that corona discharge is generated between a rectangular conductive sintered compact 10 and a moving conductive wire (diameter: about 0.1 mm$\Phi$ to about 0.35 mm$\Phi$, for example) 22 by applying a high voltage as pulses. As a result of this electrical discharge, the cutting (slicing) process step S4 proceeds in such a manner that part of the conductive sintered compact 10, in the proximity of the wire 22, is cut off. FIG. 2 shows a positional relationship between the wire 22 and the sintered compact 10 in the middle of being machined. The powder-like debris (i.e., swarf), cut off from the conductive sintered compact 10 as a result of the discharge, is rapidly pushed toward a non-discharge region by water current ejected along the wire 22 so as not to cause unnecessary discharge. The water current is formed because the water, supplied from a tank 27 via a pump (not shown), is ejected from the vicinity of a wire holding member 24a. The conductive sintered compact 10 is subjected to wire EDM while being soaked in water having a relatively high purity (having an electrical resistivity $\rho$ of about $10^5$ $\Omega$·cm or more). However, the water, ejected from the vicinity of the wire holding member 24a, can form torrential water current in the vicinity of the machined part of the conductive sintered compact 10.

The wire 22 is preferably made of brass. The wire 22 is worn away owing to the discharge as the time elapses. Thus, the wire 22 is held by wire holding members 24a and 24b while being drawn out of a first rotating reel 26a and wound in a second rotating reel 26b. Since a certain degree of tension is applied to the wire 22, the wire 22 is used as a substantially straightened line. However, a certain bend of the wire 22 is inevitable. The wire holding members 24a and 24b are secured to an arm (not shown) of the machine 20. The arm, together with the holding members 24a and 24b and the wire 22, is moved horizontally in the direction indicated by the arrow A (i.e., a cutting or slicing direction) by a driving mechanism such as a motor (not shown). In this machine 20, the wire 22 travels at a constant velocity against the workpiece (i.e., the sintered compact 10) fixed at a position. Alternatively, the wire 22 may be fixed at a position and the workpiece may be moved. The conductive sintered compact 10 is housed in a rack to be described in detail later and held and secured by a substrate holding portion 40 on the rack.

Next, the wire EDM will be described in detail with reference to FIGS. 3A through 3D. FIGS. 3A through 3D schematically show the cross sections of the thin-plate conductive sintered compact 10 and the wire 22 taken on the plane perpendicular to the wire 22.

Figure 3A:
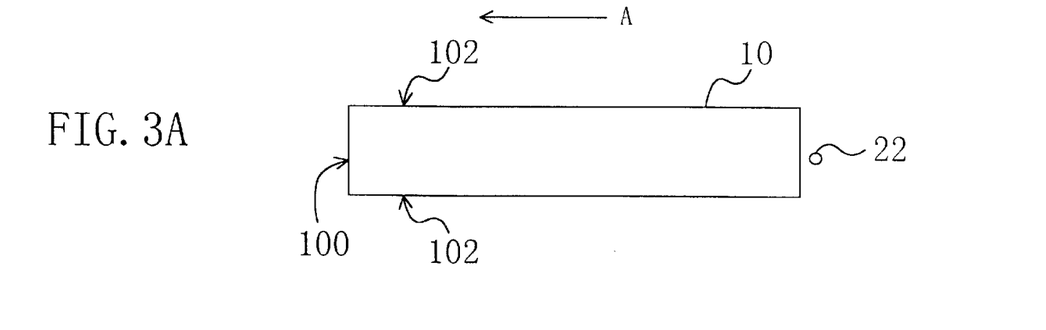
FIGS. 3A through 3D are schematic cross-sectional views of a conductive sintered compact and a wire taken on a plane vertical to the wire for illustrating a cutting (slicing) process step in more detail.
Figure 3B:
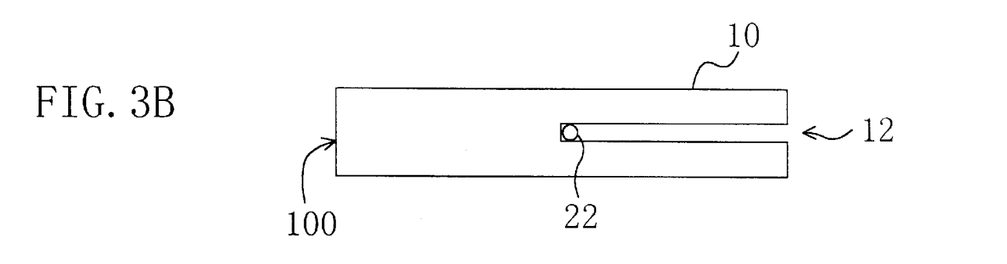
Figure 3C:
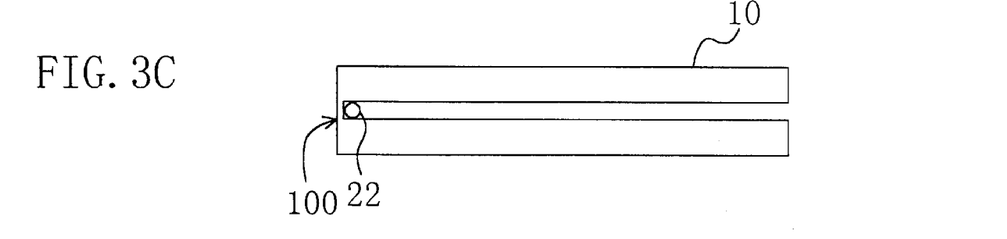
Figure 3D:
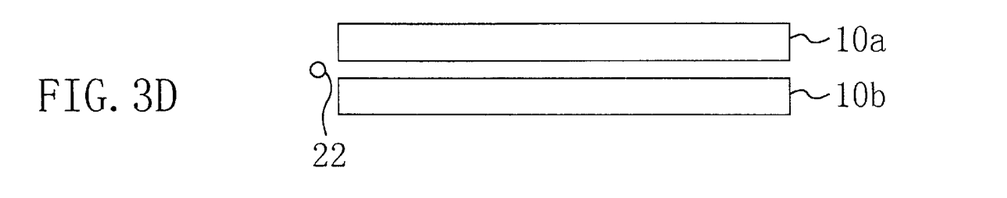

First, as shown in FIG. 3A, the wire 22 is disposed in the vicinity of one end face of the conductive sintered compact 10. A high voltage is applied by a machining power supply 28 (see FIG. 2) between the wire 22 and the conductive sintered compact 10, thereby generating electrical discharge in a space between the wire 22 and the conductive sintered compact 10. As a result of the discharge, the center portion of the end face of the conductive sintered compact 10 is cut off to form a linear groove 12 extending along the wire 22. As the wire 22 moves leftward as indicated by the arrow A, the depth (measured in the direction indicated by the arrow A in FIG. 3A) of the groove 12 increases. Consequently, as shown in FIG. 3B, a deep slit is soon formed in the sintered compact 10. The wire 22 goes toward the other end face 100 located on the left of FIG. 3B in such a manner as to divide the sintered compact 10 into two parts. Before long, the wire 22 reaches the vicinity of the end face 100 (1 to 2 mm ahead of the end) as shown in FIG. 3C. And then the wire 22 completely divides the sintered compact 10 into two parts (wafers) 10a and 10b as shown in FIG. 3D. In this manner, the two wafers 10a and 10b are cut off (sliced off) from the single sintered compact 10. At this point in time, the thickness of each of the cut and divided wafers 10a and 10b is about 1.8 mm. As can be understood easily, the thicknesses of the wafers 10a and 10b are variable with the thickness of the sintered compact 10 and the diameter of the wire 22 that are used for slicing. Accordingly, two wafers, each having a thickness of about 1.2 mm to about 1.4 mm, may be sliced off from a sintered compact having a thickness of about 3 mm.

In this embodiment, the sintered compact 10 is in the shape of a plate and has two surfaces (main surfaces) 102 that are substantially parallel to each other. The EDM is performed by moving the wire 22 on a plane that is defined by an approximate centerline between these two surfaces 102 and is substantially parallel to both of these surfaces 102. Since the surfaces formed by this moving wire 22 are substantially parallel to the two surfaces 102 of the sintered compact 10, each of the resulting two wafers 10a and 10b has a substantially uniform thickness. Alternatively, if the wire 22 and the sintered compact 10 are disposed such that the surfaces formed by the wire 22 are slightly inclined to the two surfaces 102 of the sintered compact 10, each of the wafers may have the thickness thereof varied in the direction indicated by the arrow A. Furthermore, if the wire 22 is moved on a plane closer to either one of the two main surfaces 102 of the sintered compact 10, not on the plane substantially on the centerline between these two surfaces 102, two wafers having mutually different thicknesses may be formed simultaneously. For example, it is possible to cut off a wafer having a thickness of 0.8 mm and a wafer having a thickness of 1.2 mm from a flat-plate sintered compact having a thickness of about 3.5 mm.

Figure 4:
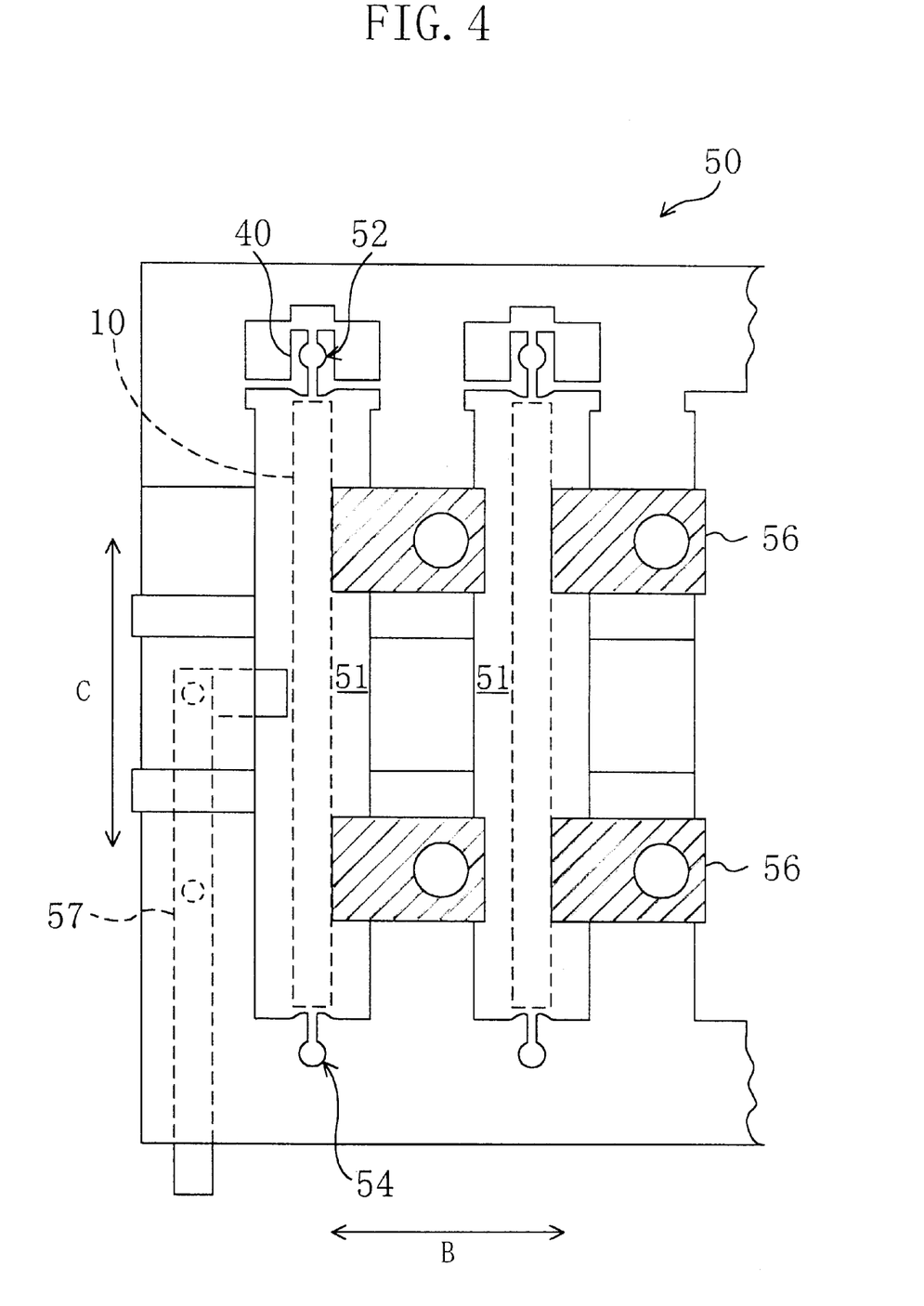
FIG. 4 is a plan view showing the top surface of an exemplary rack used for holding a sintered compact.

Hereinafter, a rack, in which sintered compacts are inserted and held during the EDM, will be described. FIG. 4 illustrates the construction of a rack 50 used in this embodiment. This rack 50 includes a plurality of substrate inserting portions 51, arranged in the direction indicated by the arrow B in FIG. 4, for housing and holding a plurality of sintered compacts (substrates) 10 simultaneously. Each of the sintered compacts 10 is inserted into an associated region, the contour of which is represented by a broken line in FIG. 4. Each of the inserted sintered compacts 10 is pressed by an associated substrate holding portion 40 in the direction parallel to the arrow C and fixed and held in place. Each substrate holding portion 40 has elasticity, and therefore can press the sintered compact 10 in the direction parallel to the main surfaces of the sintered compact 10 (i.e., the longitudinal direction thereof) with appropriate pressure, thereby preventing the sintered compact 10 from cracking or chipping. Each substrate holding portion 40 includes two members sandwiching the discharge wire 22. A required gap (e.g., a gap having a width of about 1 mm) is provided between these two members such that the wire 22 can move through the gap during slicing. A hole portion 52 surrounded by these two members of the substrate holding portion 40 corresponds to a place where the wire 22 is disposed at the start of slicing. The hole portion 52 runs through the substrate holding portion 40 in the direction perpendicular to the paper sheet of FIG. 4 so as to house the wire 22 therein. Another hole portion 54 is formed at a position where the moving wire 22 stops when slicing is finished. The hole portion 54 is formed in the vicinity of one side of the substrate inserting portion 51 coming into contact with the other end face of the sintered compact 10. In the illustrated example, this side does not have particularly high elasticity. Alternatively, a member having elasticity like the substrate holding portion 40 may be disposed on this side. The sintered compact 10 is retained between the substrate holding portion 40 and the side of the substrate inserting portion 51 (i.e., the side in the vicinity of the hole portion 54). Since the substrate holding portion 40 has elasticity, unnecessary stress is not applied onto the sintered compact 10.

The rack 50 further includes first and second pressing portions 56 and 57 for preventing the sintered compact 10 from being displaced in the direction indicated by the arrow B. The second pressing portion 57 includes: a top member movable in the direction indicated by the arrow B; and a member driving the top member. As shown in FIG. 4, the top member of the second pressing portion 57 is formed on the left-hand side of the associated sintered compact 10 so as to press the sintered compact 10 rightward at the center of the main surface thereof. In FIG. 4, only one second pressing portion 57 is illustrated. However, in actuality, the same number of second pressing portions 57 as that of the substrate inserting portions 51 are disposed. By handling a member projecting out of the rack 50, the position of the second pressing portion 57 is adjusted. That is to say, the second pressing portion 57 is moved and fixed at such a position as lightly pressing one main surface of the sintered compact 10. As a result, the sintered compact 10 is retained between the first and second pressing portions 56 and 57, thereby preventing the sintered compact 10 from being displaced during slicing. It is noted that the sintered compact 10 may be held in any other manner than that described in this embodiment. That is to say, any suitable holding mechanism may be employed in accordance with the shape and size of the sintered compact 10.

The rack 50 holding one or more sintered compacts 10 is set in an electrical-discharge wire cutting machine such as that shown in FIG. 2, thereby performing the slicing process step in the above-described manner. A voltage is supplied from the power supply 28 of the electrical-discharge wire cutting machine to the sintered compact 10 via interconnection lines and the substrate holding portion 40. For example, while current of 300 to 400 amperes is supplied to between the wire 22 and the sintered compact 10 with a pulse width of 1 to 2 microseconds (while power of about 170 W is supplied), the sintered compact 10 has a positive potential with respect to the wire 22. If a plurality of sintered compacts 10 are sliced simultaneously by moving a plurality of wires at the same time, the manufacturing efficiency of the wafers is considerably increased.

Figure 5A:
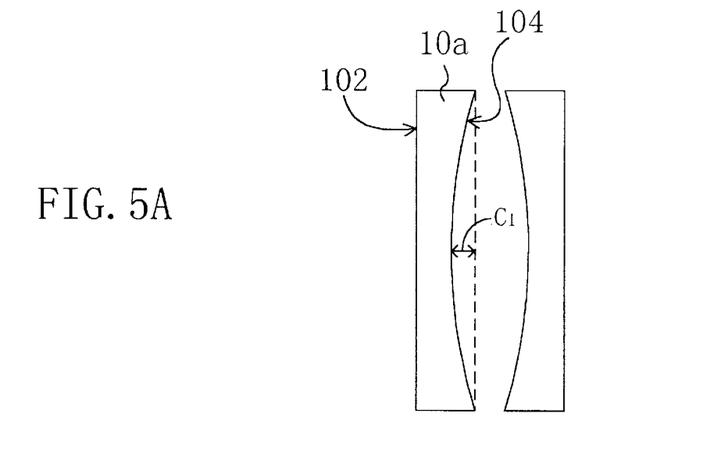
FIG. 5A is a cross-sectional view showing a crown C1 of the machined surfaces of wafers sliced off.
Figure 5B:
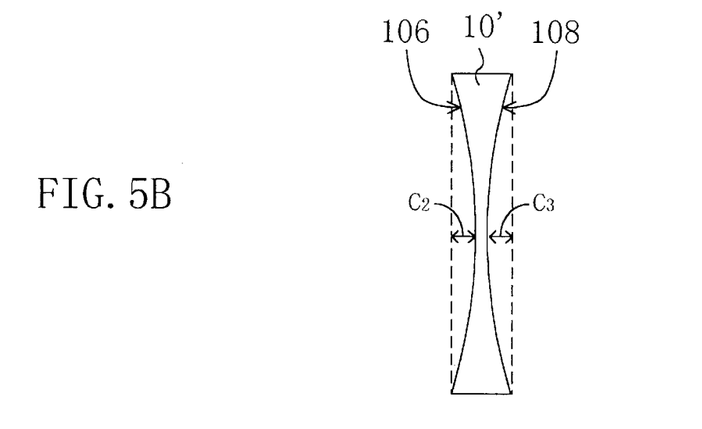
FIG. 5B is a cross-sectional view showing crowns C2 and C3 of a thin sintered compact 10'.
Figure 5C:
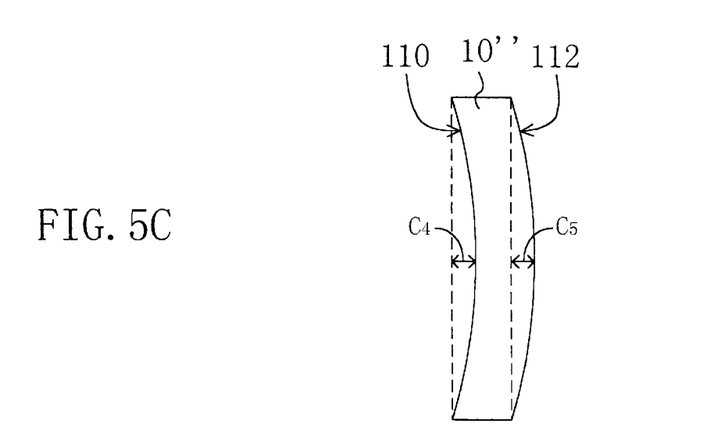
FIG. 5C is a cross-sectional view showing crowns C4 and C5 of another thin sintered compact 10".

Next, a "crown" used for evaluating the degree of "warp" will be defined. First, FIGS. 5A through 5C will be referred to. Each of the reference signs C1 through C5 shown in FIGS. 5A through 5C represents the "crown" of a particular surface. In this specification, a "crown" means a distance between the top of a convex portion (or the bottom point of a concave portion) of a particular surface and a reference plane. The "reference plane" is herein defined as a plane (indicated by the broken lines in FIGS. 5A through 5C) on which a "particular surface" would be "located" if the surface were not warped.

FIG. 5A schematically illustrates the crown C1 of a machined surface 104 of a wafer 10a sliced off. FIG. 5B illustrates the crowns C2 and C3 of surfaces 106 and 108 of a thin sintered compact 10'. And FIG. 5C illustrates the crowns C4 and C5 of surfaces 110 and 112 of another thin sintered compact 10".

Hereinafter, it will be described with reference to FIG. 6 how a cutting speed during EDM affects the surface machined by the EDM. In this embodiment, the "cutting speed" is defined as a cross-sectional area of a sintered compact cut per unit time.

Figure 6:
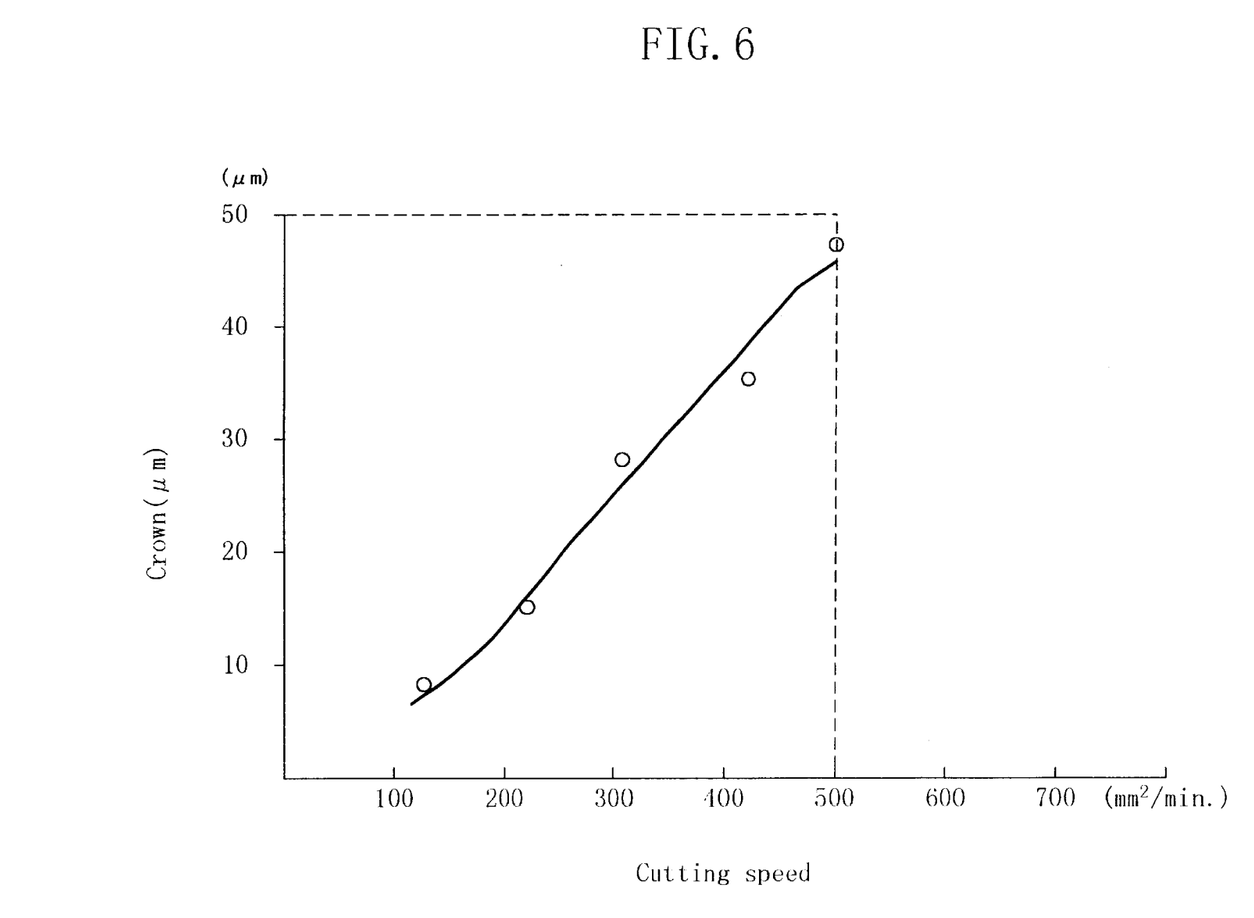
FIG. 6 is a graph showing the dependence of a "crown" of a cut (or machined) surface of a sliced wafer on a cutting speed.

FIG. 6 is a graph illustrating how the "crown" of the cut surface (i.e., the machined surface) 104 of the sliced wafer 10a varies with the cutting speed. As can be understood from FIG. 6, the higher the cutting speed (i.e., the slicing speed) is, the larger the crown is. The reason is presumably as follows. The higher the cutting speed is, the larger amount of debris (swarf) is cut off from the sintered compact 10. Accordingly, as the cutting speed is increased, it becomes increasingly difficult to remove the debris smoothly, thereby possibly generating unnecessary discharge between the wire 22 and the swarf. If the cutting speed is relatively high, the machined surface has such a shape as that shown in FIG. 5A in which a convex portion is formed in the center region thereof. If such a wafer 10a is used as a substrate for a thin-film magnetic head, the crown C1 thereof immediately after slicing is preferably 50 μm or less. This is because if the crown C1 exceeds 50 μm, then an additional process step of cutting off the protruding portion should be performed and the advantageous effects of the present invention are lost. It is when the cutting speed is 500 mm²/min or less that the crown of the sliced surface is 50 μm or less. Accordingly, the cutting speed is preferably 500 mm²/min or less.

Figure 7:
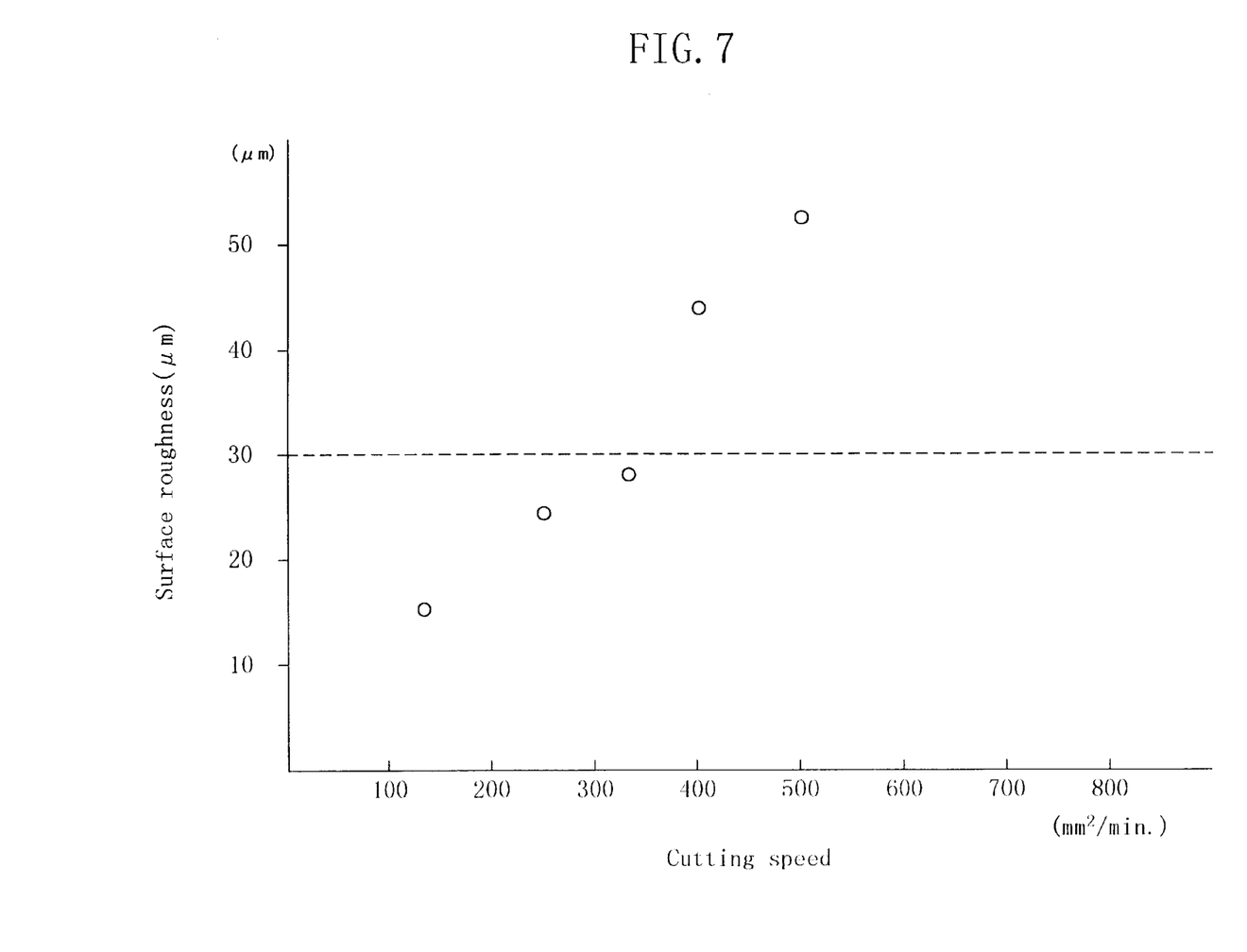
FIG. 7 is a graph showing the dependence of the roughness of a cut (or machined) surface of a sliced wafer on a cutting speed.

FIG. 7 is a graph illustrating how the surface roughness of the cut surface (i.e., the machined surface) 104 of the sliced wafer 10a varies with the cutting speed. As can be understood from FIG. 7, the higher the cutting speed is, the larger the surface roughness is. Considering that the subsequent polishing process step should be performed for as short a time as possible, the surface roughness is preferably 30 μm or less. Accordingly, from this point of view, the cutting speed is preferably 340 mm²/min or less.

The data shown in FIGS. 6 and 7 were obtained on the following conditions:

Discharge pulse width: 1 to 2 μs
Typical diameter of wire: 0.25 mmΦ
Power for electrical-discharge machining: about 170 W
Material of workpiece: alumina and titanium carbide
Size of workpiece: 4 mm×100 mm×100 mm
The crown and the surface roughness were measured by using a roughness measuring device of a needle contact type.

The data shown in FIGS. 6 and 7 were obtained where slicing was performed by setting the cutting speed at a constant value throughout the process. However, in an actual manufacturing process, the cutting speed does not have to be kept constant. For example, at the stages illustrated in FIGS. 3A through 3C, the cutting speed is preferably in the range from 130 mm²/min to 500 mm²/min, both inclusive. On the other hand, at the stages illustrated in FIGS. 3C through 3D, the cutting speed is preferably set at less than 130 mm²/min. This is because if the wire 22 passes through the end face 100 of the sintered compact at a cutting speed higher than 130 mm²/min, the end face 100 possibly cracks or chips. In order to prevent the sintered compact 10 from cracking or chipping, the cutting speed may be set at less than 130 mm²/min on all the stages shown in FIGS. 3A to 3D. However, in such a case, the processing time required for slicing adversely becomes too long. Thus, it is more efficient to set the cutting speed relatively high (e.g., about 240 mm²/min) until the wire 22 reaches a point 1 to 2 mm ahead of the end face 100, for example, and then reduce the speed to less than 130 mm²/min after the wire 22 has reached the point. The machine may be programmed such that the cutting speed is automatically switched in accordance with the movement distance of the wire 22, i.e., the length of the wire drawn out. Changing the cutting speed on at least two stages in this manner is particularly advantageous where the material to be sliced has a high hardness (e.g., where a sintered compact having a Vickers hardness of 2,000 or more is sliced). This is because the higher the hardness of a material to be sliced is, the more easily the sintered compact cracks or chips.

In accordance with the method of this embodiment, a working time required for obtaining a wafer having a thickness of 1.2 mm, for example, can be about 60% to about 70% of the time required for forming a sintered compact having a thickness of 2.0 mm and then obtaining a wafer having a thickness of 1.2 mm by polishing in accordance with a conventional method. The time required for slicing is at most 30 to 40 minutes. In this embodiment, two wafers are efficiently cut off from a single sintered compact. Accordingly, the material is not wasted too much, and the present invention can contribute to more effective utilization of natural resources.

In this embodiment, two wafers are cut off from a single sintered compact by using a single wire. Alternatively, if the number of wires is set at n (where n≧2), a number (n+1) of wafers can be simultaneously cut off from a single sintered compact. As a result, the work efficiency can be further increased. However, in order to realize such multitasking, the diameter of a wire should be sufficiently small or the thickness of a sintered compact yet to be sliced should be sufficiently large. Nevertheless, if a sintered compact is formed too thick, sintering might be incomplete inside such a sintered compact. Accordingly, in order to form a thick sintered compact, the sintering method should be improved. Furthermore, even if slicing is repeatedly performed on the same sintered compact several times by using a single wire, three or more wafers can be cut off from the single sintered compact.

In this manner, the present invention employs a novel method, in which a relatively thick sintered compact is intentionally formed and then sliced, though a thinner and thinner wafer will be demanded as a substrate for a thin-film magnetic head in view of the current circumstances. Also, paying special attention to the fact that the sintered compact has conductivity in such a case, the present inventors employed wire electrical-discharge machining to succeed in efficiently obtaining a wafer having a desired thickness. Furthermore, we found the relationship between the machining (cutting) speed and the crown or the surface roughness and performed electrical-discharge machining on appropriate conditions to succeed in cutting off a plurality of wafers having a high degree of planarity required for substrates for a thin-film magnetic head with a good yield. As can be understood, the method of the present invention can make it possible to provide a thin and highly hard high-performance ceramic substrate for a thin-film magnetic head with high economical efficiency in order to cope with the forthcoming increase in storage capacity and to improve the productivity. Accordingly, the present invention has very broad industrial applicability.

In the foregoing, the present invention has been described as being applied to a method for manufacturing ceramic substrates for a thin-film magnetic head. However, the application of the present invention is not limited thereto. This is because, in general, when a thin-plate member is formed by sintering, the problem of "warp" possibly happens at any time. Accordingly, the present invention is also effectively applicable to the formation of a small magnet by performing a sintering process. A magnet is now used in a great many applications. Thus, depending upon the application, the size of a magnet will be further decreased and a thin-plate magnet of such a type as causing a warp will be required. Accordingly, it is expected that the present invention is very effectively applicable to broad fields including the field of sintered magnets.

It is noted that slicing may be performed by any other method than the wire EDM. For example, a sintered compact may be sliced by utilizing a wire saw technique using abrasive particles and a wire or by employing a small dicing saw. In these cases, since the electrical discharge phenomenon is not utilized, the sintered compact does not have to have conductivity. Herein, "having conductivity" means having electrical resistivity $\rho$ low enough to enable the electrical-discharge machining. For example, a sintered compact having electrical resistivity $\rho$ of $2 \times 10^{-3}$ $\Omega \cdot m$ or less may be regarded as having conductivity.

Also, the sintered compact to be sliced does not have to be rectangular. Depending on the shape of a wafer to be formed, a disc-shaped sintered compact may also be formed. The thickness of the sintered compact is not limited to 4 mm, either. If a sintered compact having a thickness of about 2 to about 3 mm can be formed with a relatively small "warp", a thin-plate sintered compact half or less as thick (from 0.5 to 1.2 mm) as such a sintered compact may be formed by performing a slicing process after the sintered compact has been formed. Even in such a case, a thin-plate sintered compact can be manufactured with a higher productivity as compared with a conventional method. The sintered compact to be sliced is not necessarily a flat plate. For example, even if a sintered compact is a mass in the shape of an ingot, wafers (or substrates) having a required thickness can be formed by performing a slicing process.

According to the present invention, a conductive sintered compact having such a thickness as to cause a "warp" to a negligible degree is formed and then sliced, thereby cutting and dividing the conductive sintered compact into two or more conductive wafers. Thus, wafers having a desired thickness can be provided with high productivity while shortening the time taken to perform molding process such polishing and minimizing the waste of a material. In an embodiment where the sintered compact is sliced by wire electrical-discharge machining, in particular, even a highly hard ceramic material can be machined with high precision. Accordingly, such an embodiment is very practical.

Also, according to the present invention, by adjusting the cutting speed for the wire electrical-discharge machining, the warp and the surface roughness of wafers machined can be reduced to desired levels. As a result, the time required for a subsequent polishing process can be shortened to a large degree. Furthermore, by setting the cutting speed relatively low just before the sintered compact has been completely cut, it is possible to prevent the sintered compact from cracking or chipping.

What is claimed is:

1. A method for manufacturing conductive wafers, comprising the steps of:

forming a plate of conductive sintered compact having two surfaces that are substantially parallel to each other; and slicing the plate of conductive sintered compact along at least one plane substantially parallel to the two surfaces of the plate of conductive sintered compact, thereby cutting and dividing the plate of conductive sintered compact into only two conductive wafers, each of the two resulting wafers having a thickness of about 1.6 mm to 1.8 mm.

2. The method of claim 1, wherein the conductive sintered compact is sliced by wire electrical-discharge machining with the application of a voltage between a wire for discharge and the conductive sintered compact while one of the wire and the conductive sintered compact is moved against the other.

3. The method of claim 2, wherein the voltage is applied as pulses.

4. The method of claim 2, wherein the cutting speed is 500 mm$^2$/min or less.

5. A method for manufacturing conductive wafers, comprising steps of:

forming a conductive sintered compact having two surfaces that are substantially parallel to each other; and slicing the conductive sintered compact along at least one plane substantially parallel to the two surfaces of the conductive sintered compact, thereby cutting and dividing the conductive sintered compact into at least two conductive wafers;

wherein the conductive sintered compact is sliced by wire electrical-discharge machining with the application of a voltage between a wire for discharge and the conductive sintered compact while one of the wire and the conductive sintered compact is moved against the other, and wherein a cutting speed at which the wire cuts the conductive sintered compact is adjusted such that a machined surface of each of the cut and divided conductive wafers has a crown of 50 $\mu$m or less.

6. A method for manufacturing conductive wafers, comprising steps of:

forming a conductive sintered compact having two surfaces that are substantially parallel to each other; and slicing the conductive sintered compact along at least one plane substantially parallel to the two surfaces of the conductive sintered compact, thereby cutting and dividing the conductive sintered compact into at least two conductive wafers;

wherein the conductive sintered compact is sliced by wire electrical-discharge machining with the application of a voltage between a wire for discharge and the conductive sintered compact while one of the wire and the conductive sintered compact is moved against the other, and wherein at least between 1 mm ahead of an endpoint at which the wire finishes cutting the conductive sintered compact and the endpoint, the wire cuts the conductive sintered compact at a lower speed than a speed at a start point at which the wire starts cutting the conductive sintered compact.

7. The method of claim 6, wherein the wire cuts the conductive sintered compact at a speed of 130 mm$^2$/min or less at the endpoint.

8. The method of one of claims 1 to 7, wherein the conductive sintered compact is made of a conductive ceramic containing alumina, titanium and carbon.

9. A method for manufacturing ceramic substrates for a thin-film magnetic head, comprising the steps of:

forming a plate of conductive sintered compact having two surfaces that are substantially parallel to each other by sintering raw material powder and polishing a resulting sintered compact; and slicing the plate of conductive sintered compact along at least one plane substantially parallel to the two surfaces of the plate of conductive sintered compact, thereby cutting and dividing the plate of conductive sintered compact into only two ceramic substrates for a thin-film magnetic head, each of the two resulting ceramic substrates having a thickness of about 1.6 mm to 1.8 mm.

10. A method for manufacturing ceramic substrates for a thin-film magnetic head, comprising the steps of:

forming a plate of conductive sintered compact having two surfaces that are substantially parallel to each other by sintering raw material powder and polishing a resulting sintered compact;

slicing the plate of conductive sintered compact along at least one plane substantially parallel to the two surfaces of the plate of conductive sintered compact, thereby cutting and dividing the plate of conductive sintered compact into at least two ceramic substrates for a thin-flim magnetic head, and polishing a surface of each said ceramic substrate for a thin-film magnetic head to reduce the thickness of the substrate 1.2 mm or less, the substrate being polished to lose 0.7 mm or less.

11. A method for machining conductive wafers, comprising the steps of:

setting a conductive sintered compact into an electrical-discharge wire cutting machine; and cutting and dividing the conductive sintered compact into a plurality of conductive wafers by slicing the conductive sintered compact with the application of a voltage between a wire of the electrical-discharge wire cutting machine and the conductive sintered compact while one of the wire and the conductive sintered compact is moved against the other, each said conductive wafer having a crown of 50 $\mu$m or less and a thickness that is one half or less of the thickness of the conductive sintered compact.

12. The method of claim 11, wherein in the step of cutting and dividing the conductive sintered compact, an end face of the conductive sintered compact is pressed by an elastic holding member in a direction parallel to a moving direction of the wire.

* * * * *